May 24, 1949.  E. I. STEARNS, JR., ET AL  2,471,248
PHOTOMETRIC APPARATUS AND SPECTROPHOTOMETERS USING
POLARIZED LIGHT AND AN OPTICALLY ACTIVE PLATE
Filed March 17, 1948  3 Sheets-Sheet 1
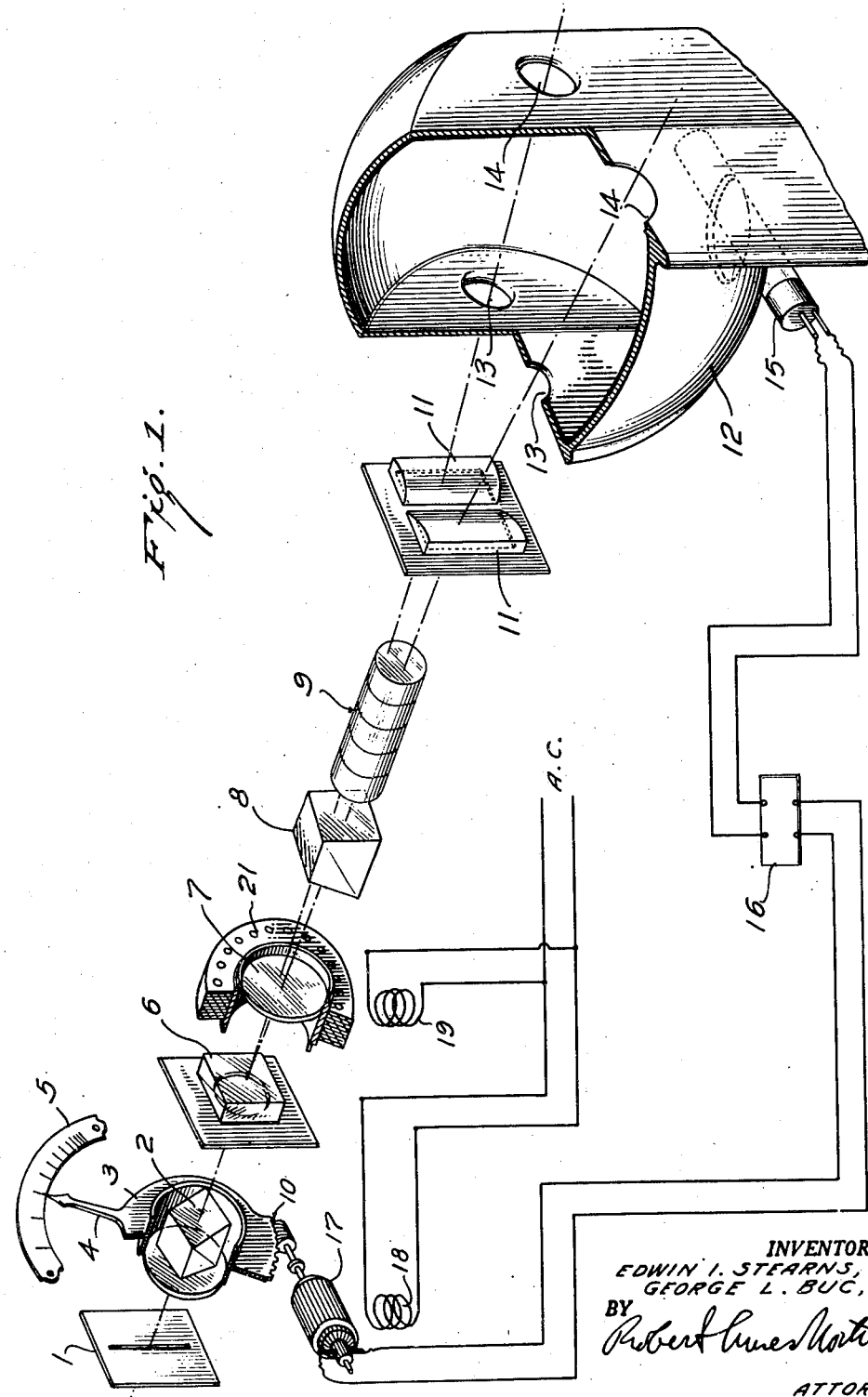
INVENTORS
EDWIN I. STEARNS, JR.,
GEORGE L. BUC,
BY
ATTORNEY

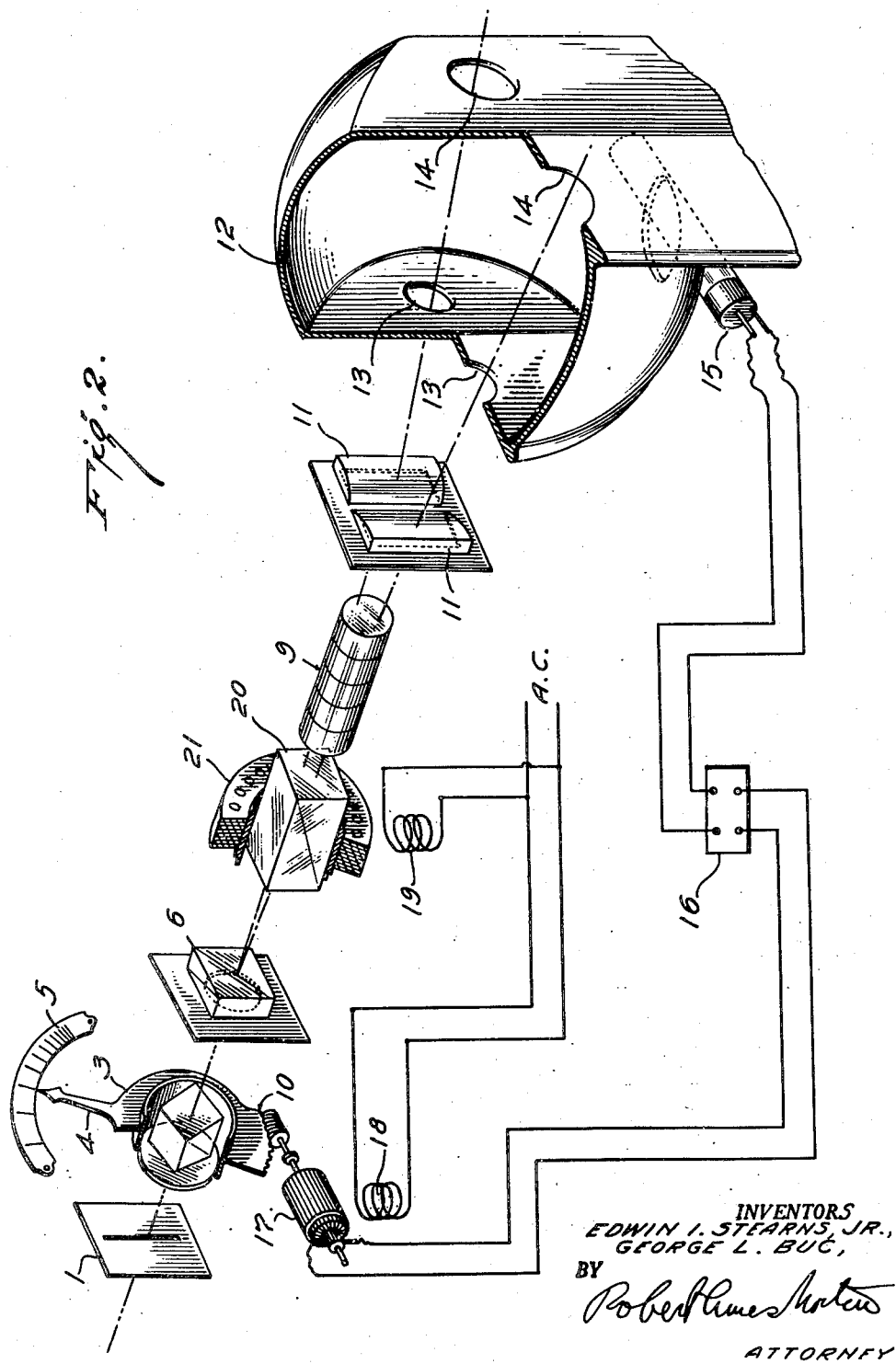

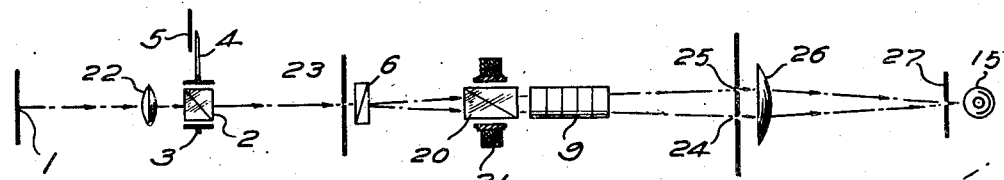
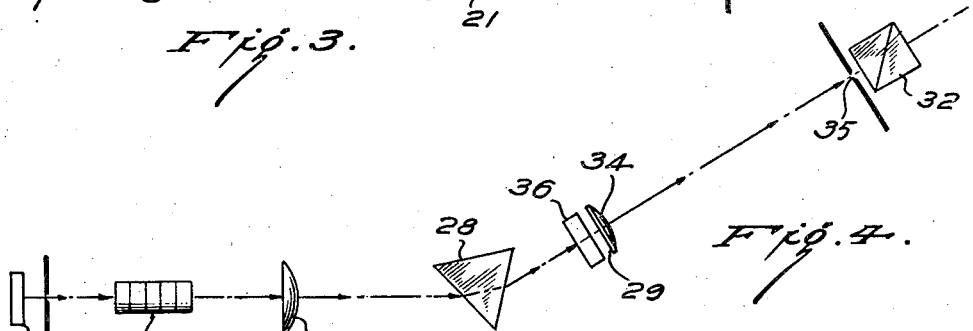
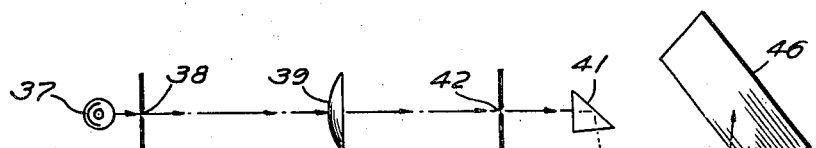
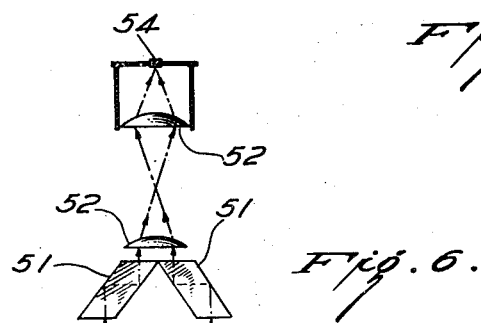

Patented May 24, 1949

2,471,248

UNITED STATES PATENT OFFICE 2,471,248

PHOTOMETRIC APPARATUS AND SPECTROPHOTOMETER USING POLARIZED LIGHT AND AN OPTICALLY ACTIVE PLATE

Edwin I. Stearns, Jr., North Plainfield, and George L. Buc, Orange, N. J., assignors to American Cyanamid Company, New York, N. Y., a corporation of Maine Application March 17, 1948, Serial No. 15,464
In Canada October 20, 1944

20 Claims. (Cl. 88—14)

This invention relates to improved photometric devices involving polarizing elements.

A number of photometric devices have been developed and some of them involve polarizing elements. In some cases the polarization is incidental and performs no useful function. Thus, for example, monochromating devices produce varying degrees of polarization at different wave lengths in the visible, ultra violet and infrared portions of the spectrum. The polarizing may be due to reflection from mirrors or other elements incidental to the photometric apparatus. In most cases the polarization performs no useful function but is unavoidable. Examples of such devices are ordinary photometric spectrophotometers, spectrographs and the like.

Another type of photometric apparatus in which polarization may enter is comparison colorimeters using split comparison fields. An example of such is a Dubosc colorimeter in which polarization results from the mirrors in the instrument. In general any photometer which uses a mirror will introduce various degrees of polarization.

Some photometric instruments and spectrophotometers use polarization deliberately to effect photometering. A simple instrument of such a type is a Martens photometer in which light beams from a sample and standard pass through a Wollaston prism which polarizes them at right angles. Polarizers such as a Nicol or a Rochon prism effect photometering. The type of device is also used in the Koenig-Martens spectrophotometer.

In more recent years polarized flickering beam spectrophotometers have achieved great success and their speed and precision account for their predominant position.

All of these types of apparatus possess a common characteristics, namely, the optical system includes a sample illuminating means and photometering means in which at least one element polarizes light partially or wholly. All of these instruments give different readings when a polarizing sample is present depending on the orientation of the sample, that is to say, its azimuth with respect to the optical axis of the polarizing elements of the instrument. This variance is known as the azimuth effect and introduces a serious error even in the most highly developed spectrophotometers of the polarized flickering beam type. The first successful commercial machine of this type is described in the patent to Orrin Weston Pineo, No. 2,107,836, February 8, 1938. In this spectrophotometer, light from a Van Cittert double monochromator passes through a photometering Rochon prism, then through a Wollaston prism and finally through a Rochon prism which is rotated at an accurately predetermined rate by means of a synchronous motor. The two beams from the Wollaston prism which are polarized at right angles to each other after passing through the rotating Rochon strike samples and standards of either reflectance or transmission and the total light from the two beams is integrated in an integrating sphere and the integrated light impressed on a phototube which is in the input circuit of a very high gain audio frequency amplifier. The amplified output is then impressed on the armature of a motor, the field of which is supplied with the same current used in driving the synchronous motor and which drives the photometering Rochon prism in a direction which will result in a change in intensities of the flickering beams to cause the intensities of the beams in the integrating sphere to be equal, at which time there is present in the integrating sphere no light fluctuation at flicker frequency and hence no amplified signal at flicker frequency. The photometering motor may drive an indicating device for an automatic recorder of known design.

The polarized flickering beam spectrophotometer has achieved great success because in its most elaborate modifications curves of photometric absorption or reflectance can be automatically drawn in a very short time. Great as is the advance represented by the polarized flickering beam spectrophotometer over early instruments, in its original form the device had some disadvantages. In that form, the light incident on the specimen is varying its plane of polarization, so that in many cases an unknown factor of variation is introduced which may vitiate the results. Further, spurious signals of the fundamental and harmonic frequencies are produced in the photo-cell circuit which obscure the vanishing signal at balance and so result in loss of sensitivity in detecting the balance point.

In the patent of O. W. Pineo, No. 2,126,410, August 9, 1938, there are described a number of different flickering means which when followed by a stationary polarizer, such as, for example, a Rochon prism, produced reliable flickering with beams which maintain a constant plane of polarization instead of a plane which rotates with rotation of the flicker prism as in the early Pineo patent referred to above. These means include a rotating retardation plate, such as a half-wave plate, Kerr cells impressed with alternating voltage at flicker frequency or magnetostrictive devices. In the improved instrument which is described in the two Pineo patents the reduced sensitivity with polarizing samples is completely overcome and for the first time it becomes possible to obtain reliable and accurate spectrophotometric measurements of polarizing samples. The great advance in sensitivity and accuracy with polarizing samples, however, obtained only if the orientation of the sample was constant and hence the azimuth of polarization did not change. Conflicting results were obtained if the same sample was measured at different azimuths.

In the patent of O. W. Pineo, No. 2,189,270, February 6, 1940, there is described an improvement on the instrument using a stationary plane of polarization in which the final Rochon prism is followed either by a quarter wave plate or a Fresnel rhomb. Both of these devices transfer plane polarized light into circularly polarized light which is not sensitive to change in azimuth of the sample. The improvement described in the last mentioned Pineo patent, while of definite practical value, was not a complete solution of the azimuth problem because unfortunately a quarter wave plate gives a retardation of exactly a quarter of a wave length at only one frequency of light. Light of other frequencies within the visible spectrum are not circularly polarized but are elliptically polarized with ellipses of increasing eccentricity as the frequency of the light varies from that at which the quarter wave plate gives a true retardation of a quarter of a wave length. The elliptically polarized light at other frequencies materially reduces the azimuth effect as compared with plane polarized light but is still not perfect.

The Fresnel rhomb is less sharply selective with respect to wave length and from this standpoint gives a greater degree of azimuth correction. However, as described in the patent, it requires an offset in the light path and presents some mechanical disadvantages as compared to a quarter wave plate.

A somewhat different form of polarizing flickering beam spectrophotometer is one in which the integrating sphere is replaced by a lens which brings together the two divergent beams onto a phototube or other photoelectric device. In order to avoid critical adjustment the image on the photoelectric means may be thrown slightly out of focus or the beams may be focused on a ground glass or similar diffuser so that the photoelectric means is illuminated by diffuse combined light. In the simple photometric apparatus and the Pineo spectrophotometer the azimuth problem is the same.

According to the present invention the azimuth effect is eliminated by interposing between the sample and/or standard and in the nearest polarizing element a relatively thick plate of optically rotatory material such as, for example, quartz cut so that the optical axis is parallel to the path of light and through.

When plane polarized light from a portion of the spectrum of finite width, such as is transmitted through the exit slit of an ordinary monochromator passes through a sufficiently long path of optically rotatory material. The plane of polarization is rotated through different angles for different wave lengths. If the path of travel through the optically rotatory material is sufficiently long, the plane of polarization will be rotated to different orientations through a range of at least approximately 90° for standard 10 millimicron band of light. The light being distributed in a series of planes uniformly throughout the range above specified averages out effect due to orientation of a polarizing sample and the same average response through the 10 millimicron band will be given regardless of the azimuth of the sample. The effect of the present invention is obtained with any optically rotatory material which has otherwise suitable characteristics. Practical considerations, however, require that the path be not excessive as otherwise a cumbersome machine results and differential absorption with wave length may become sufficient to reduce the accuracy of the machine. While no sharp critical path length exists in general we prefer not to use paths materially exceeding 25 or 30 cm. This requirement sets some limitation on the optically rotatory material for practical operation and excludes many substances which show rotatory power but are so weak that they would require excessive path length.

The best all around material for operation throughout the visible spectrum and into the ultra violet is quartz. The optically rotatory power of quartz cut with the light path parallel with the axis varies from 0.4° per millimeter for 10 millimicrons in the red end of the spectrum to more than 2° per mm. for 10 millimicrons in the violet end. The averages through the visible spectrum is about 1° per mm. for 10 millimicrons. In the ultra violet the rotatory power increases very rapidly so that any plate or series of plates which is satisfactory for the visible spectrum is more than sufficient for ultra violet. In the red end of the spectrum a path length of between 22 and 23 cm. is necessary. Through most of the visible spectrum the rotatory power of quartz is greater and a plate of about 10 or 12 cm. is sufficient. Because of the large increase in cost with crystal size, it is desirable to use a series of plates of quartz which may be mounted in air or cemented together and this is the preferred modification.

Another material of useful optically rotatory power is anisal-camphor, $C_{18}H_{22}O_2$. This substance has about twice the optical rotatory power of quartz and a plate of from 10 to 12 cm. suffices even for the red end of the spectrum. However, the material is not as rugged and chemically inert as quartz and requires protection.

As far as optical rotatory power is concerned cinnabar would be the ideal substance. In the red and yellow range its optical rotatory power is about 30 times as great as that of quartz and a plate less than a centimeter thick would be adequate. However, cinnabar is not uncolored and its strong absorption in the shorter wave lengths of the spectrum presents a serious problem where an apparatus is to be used throughout the whole visible spectrum because the energy loss due to absorption becomes excessive. On the other hand, cinnabar absorbs least in the red and yellow region where the rotatory power of quartz is at its lowest and for operations in the red and yellow regions of the spectrum cinnabar is ideal.

It is not necessary that a single optically rotatory substance be used in the present invention and for some purposes a series of quartz plates totaling 9 to 12 cm. in path length with a thin removable plate of cinnabar, for example, from 2 to 5 mm. thick presents a useful compromise in instruments of the balancing or null type such as flickering beam spectrophotometers and such combinations of such optically rotatory material are included in the present invention.

The elements which effect multiple rotation must be located between the sample and the nearest element in the device which introduces polarization because the desired effect is to cancel out asymmetrical polarization by the sample. If the elements are located beyond the nearest polarizing element they will be ineffective because the damage will already have been done.

The design of the optical instrument will determine whether the multiple rotating element can be single or whether separate elements must be used. In flickering beam spectrophotometers, spectrographs such as a Hilger spectrograph, Martens photometer and Koenig-Martens spectrophotometers the beams are so closely adjacent that a single element may be used. In other instruments such as a Dubosc colorimeter the beams may be too far apart and separate elements are necessary. Wherever possible it is desirable to use a single element.

The term "plate" is used in the specification and claims in the usual optical sense as a transparent parallelepiped and not in the more restricted sense in which it is often used in everyday life, that is to say, an element the linear dimensions of whose faces are much greater than its thickness. In the case of the present invention, which requires a relatively long path of travel, except for cinnabar, the thickness of the plate may be many times the linear dimensions of either of its faces. For example, it may be in the form of a cylinder. However, the actual operation depends on the parallelism of its faces and it is therefore properly defined optically as a plate. This more general definition will be adhered to throughout.

While the elimination of the azimuth effect is generally effected by means of the present invention in any of the types of photometering instruments involving polarization it produces additional results in certain polarized flickering beam spectrophotometers. In a Pineo spectrophotometer using half wave plate flickering, only elimination of azimuth effects results. When, however, Rochon flickering is used an important additional advantage is obtained because the lack of sensitivity in measuring polarizing samples is overcome. In instruments using Rochon flickering, the present invention presents two advantages instead of one and it is a further advantage that the two results are obtained without compensating disadvantages. It is thus possible by means of the present invention to modernize existing equipment at nominal cost as well as to design new equipment of improved effectiveness. Because of the comparatively high cost of automatic recording spectrophotometers of the flickering beam type, this is an important, economic advantage because it is not necessary to scrap a comparatively large investment in equipment in order to obtain improved performance.

It should be noted that since the path of light travel is parallel to the optical axis of the rotatory plates, it is not necessary to provide for a precise orientation and in the case of Rochon flickering the rotatory plate or plates are stationary and do not have to be cemented to the rotatory Rochon prism as is the case with optical elements which must preserve a definite orientation such as retardation plates. This is an advantage of the present invention as compared to the use of multiple retardation plates which form the subject matter of our copending application Serial Number 569,946, filed December 27, 1944. This off-sets partially or wholly the higher cost of the much thicker plates required. Not only is a very stable mechanical structure possible but there is no problem due to initial orientation of elements or subsequent slippage.

It should be noted that the present invention averages out azimuth effects only for spectral bands of finite width. It will not operate with true monochromatic light which corresponds to a spectral band having only a single wave length. This, however, is not a practical disadvantage since most useful spectrophotometers employ a monochromator with an exit slit of finite width. Investigation of the absorption or reflection of light from certain line spectra cannot utilize the advantages of the present invention where the lines are not of finite width. However, such a source of light is never practically used in spectrophotometers of this type.

The invention will be described in greater detail in conjunction with the drawings in which:

Fig. 1 is a perspective view of a spectrophotometer using a half wave plate flickering means;

Fig. 2 is a similar perspective view of a spectrophotometer using Rochon prism as flickering means;

Fig. 3 is a diagrammatic view of flickering beam spectrophotometer using Rochon flickering and a recombination of the two beams instead of an integrating sphere;

Fig. 4 is a diagrammatic elevation of a Koenig-Martens spectrophotometer using a multiple retardation plate;

Fig. 5 is a perspective diagram of a Hilger spectrograph using a multiple retardation plate, and Fig. 6 is a perspective diagram of a Dubosc colorimeter using a pair of multiple retardation plates.

In the spectrophotometer shown in Fig. 1, a narrow band of light emerges from the exit slit 1 of the monochromator (not shown) which may be of any conventional desin. The beam then passes through a photometering prism 2 carried in a rotatable hollow sleeve 3 which is provided with a pointer 4 moving over a scale 5. The photometering prism, which is preferably a Rochon prism serves the purpose of transforming the light into plane polarized light which is then passed through a Wollaston prism 6 which splits the beam into two divergent beams plane polarized at right angles to each other. The two beams then pass through a half wave plate 7 which is rotated at one quarter flicker frequency by a synchronous motor 21. The half wave plate causes the planes of polarization of the two beams to rotate at the same rate.

The beams which are flickering in opposite phases then pass through a stationary Rochon prism 8 and finally through a series of cemented plates 9 of optically rotatory material such as quartz cut with the faces at right angles to the axis. The plates are small cylinders and may have a total path length between 22 and 23 cm. all of quartz. In passing through the plates each 10 millimicrons band of light is rotated so that the wave lengths constitute plane polarized light the planes being orientated uniformly through at least 90°. The two beams then pass through the conventional decentering lenses and enter the integrating sphere 12 through the windows 13 and may encounter reflectance samples and standards mounted behind the windows 14. The integrated light from any beam is averaged with respect to its states of polarization so that the same average response is obtained with a polarizing sample regardless of azimuth. When the two beams are of equal intensity, the integrated light in the sphere does not change but if the reflectance of the sample for a particular narrow wave length band changes, for example, increases, the integrated light will pulsate in phase with the more intense of the two beams. These pulsations are transformed by the phototube 15 into a signal of flicker frequency and are amplified by a high gain audio frequency amplifier 16 and fed to the armature 17 of the motor driving the photometering prism through the suitable gearing 10. The field 18 of the photometering motor and the field 19 of the flicker motor are fed with alternating currents of flicker frequency. The motor 17 responds only to amplified current at flicker frequency and is phased to turn in such a direction that the intensity of the stronger beam in the integrating sphere is decreased and the intensity of the other beam is increased until a state of balance occurs. The degree of rotation of the photometering prism is shown by the movement of the pointer 4 over the scale 5 and is a measure of the amount of unbalance and hence of the reflectance change of the sample at the particularly narrow wave length band which in a practical instrument may be of the order of magnitude of 10 millimicrons. The photometering motor may drive a conventional recorder if it is desired to have a recording spectrophotometer instead of an indicator.

Fig. 2 illustrates a spectrophotometer which has the same elements (bearing the same reference numerals) as in Fig. 1 with the difference that the half wave plate 7 and stationary Rochon prism 8 are replaced by a rotating Rochon prism 20 rotated by a motor 21. The multiple rotatory plates 9 are mounted in a stationary position as they do not have to turn with the Rochon prism 20, each of the beams is split into a series of plane polarized components the orientation of the planes of polarization being distributed in the same manner as in Fig. 1.

In Fig. 2 the multiple rotatory plates not only perform the function of eliminating azimuth effect which it does in Fig. 1 but it also gives the instrument as high sensitivity with polarizing samples as is possessed by a half wave plate flickering device. Thus in Fig. 2 the multiple rotatory plates perform two functions and do not adversely affect the great range which is characteristic of spectrophotometers using Rochon flickering. Therefore, Fig. 2 represents the preferred embodiment.

The multiple rotatory plate or plates used in the present invention represent but a small fraction of the cost of a flickering beam spectrophotometer. It is therefore possible to add such an element to existing spectrophotometers and thus simply transform them into instruments having the advantage that azimuth effect is cancelled out, particularly a spectrophotometer using Rochon flickering, which in many ways is inferior to one using a half wave plate flickering, is transformable into a more perfect instrument by the use of the present invention and at a cost which is small compared to the total cost of the recording spectrophotometer. The present invention is therefore applicable to the improvement of existing machines as well as to new machines which constitutes an important practical advantage of the present invention.

Fig. 3 is a diagrammatic view of the optics of a polarized light flickering beam spectrophotometer using combined images instead of an integrating sphere. The same parts bear the same reference numbers. The light issuing from the monochromator exit slit 1 is imaged on a slit 23 by the lens 22, the beam passing through a photometering Rochon prism 2 mounted in a rotatable sleeve 3 and carrying a pointer 4 which moves over a scale 5. After leaving the slit 23 the beam passes through a Wollaston prism 6 which splits it into two divergent beams plane polarized at right angles to each other. The beams then pass through a Rochon flickering prism 20 rotated by the motor 21. The plane polarized beams leaving the flicker prism passes through multiple rotatory plate 9. The operation of the mechanism is the same as in Fig. 2 each beam being subjected to multiple rotation at different wave lengths at a 10 millimicron band and then passing through sample and standard windows 24 and 25. The beams are then focused by the lens 26 onto the plane of a ground glass screen 27. The diffused light of the combined images illuminates the phototube 15, the output of which can be amplified and effect photometering in the conventional manner as is shown in Figs. 1 and 2.

The operation of the spectrophotometer is the same as that shown in Figs. 1 and 2 except that it is suitable only for transmission samples. The correction of the azimuth effect and improved sensitivity of the Rochon flickering with polarizing sample is the same as in Fig. 2.

Fig. 4 illustrates a split field type of spectrophotometer, namely, a Koenig-Martens spectrophotometer in which light from a sample and standard is monochromated and photometered. The view is a horizontal elevation and shows the beam from one of the two samples 31 one of which may act as a standard. The beam then passes through a multiple rotatory plate 30 and is collimated by the lens 33 and passes through a rotatable dispersing prism 28. The spectra from the two beams then pass through a Wollaston prism 36, the axis of which is at right angles to the plane of the figure, and finally through a bi-prism 29 and lens 34 which images the spectra on a slit 35. The narrow band of light from the slit then passes through a photometering polarizer 32 which can be turned to make the two fields from sample and standard beams equal in brightness. The figure is a diagram of the optics only, the photometering Rochon prism is naturally mounted in the conventional manner.

Non-uniform response from polarizing samples and standards at different azimuths is completely averaged by the multiple rotatory plate which is the only added element in the Koenig-Martens spectrophotometer. The usefulness of the instrument is therefore extended to polarizing samples by an addition of a cheap optical element which does not require reconstruction of the instrument.

Fig. 5 is a diagram, partly in perspective, of a Hilger spectrograph. Light from a source 37, which may be, for example, ultra violet light, passes through the slit 38, collimating lens 39 and sample 42 onto the totally reflecting prism 41 inside the body of the spectrograph. The beam then passes through a multiple rotatory plate 40 and thence through the conventional lens 44, dispersing prism 45 with reflecting back, and then through the lens 44 onto the photographic plate holder 46. The diagram is that of a conventional spectrograph except for the element 40. Non-uniform responses from polarizing samples at different azimuths are completely averaged over the spectrum by the multiple retardation plate 40. This element may be included in a conventional Hilger spectrograph without any reconstruction and it extends the usefulness of the optical device to the accurate measurement of polarizing samples regardless of the azimuth of the sample.

Fig. 6 is a diagram, partly in perspective, of a Dubosc colorimeter equipped for measuring solid samples and provided with a pair of multiple retardation plates. A source of light 47 illuminates a diffusing screen 48 and the diffused light is reflected by a mirror 49 up through the instrument which includes a sample holder 43 and photometering neutral wedge 53. The light beams also pass through the conventional double reflecting prism 51, lenses 52 and ocular 54. The only change in the instrument is the provision of multiple rotatory plates 50 in each of the two beams. Non-uniform response with polarizing samples to the varying degrees of polarization introduced by the mirror 49 is completely eliminated and the colorimeter may be used with polarizing samples with the same accuracy as with other samples.

The advantages of the present invention are not limited to instruments operating with light in the visible spectrum, although these instruments represent the largest field of photometric apparatus. Elimination of the azimuth effect by means of the present invention is just as important with machines using ultra violet light so long as the light still becomes polarized. Machines operating only in the ultra violet can use much thinner plates of optically rotatory material because most such materials, for example quartz, have a much higher differential rotatory power in the ultra violet. Machines operating only in this region can use plates less than 4 cm. thick. The present invention therefore may be considered as being more efficient in the ultra violet than in the visible, a condition which is not ordinarily observed with most optical instruments.

The principles of the present invention apply to the near infrared but the lower differential rotatory power of quartz renders the instruments less effective in this region except within the range for which cinnabar plates are adequately transparent. Since it is possible to use the present invention in the near infrared and the ultra violet as well as in the visible spectrum the term "light" will be used in a broader sense to include ultra violet and the near infrared.

When infrared or ultra violet light is used, suitable sources must be employed together with suitable receptors. Of course the optics must also be of the proper composition, quartz optics being ordinarily used in the ultra violet and the near infrared. In Figs. 1–3 phototubes of suitable characteristics may be used which are sensitive in the near infrared. Fig. 5 requires only the use of the optics of suitable material and film appropriately sensitized.

Visual observation which is employed in the case of instruments shown in Figs. 4 and 6 must be replaced by photographic observation or fluorescent observation for the ultra violet and photographic or special cathode ray tube devices for the near infrared.

This application is in part a continuation of our copending application Serial No. 569,946, filed December 27, 1944, which in turn is a continuation of our now abandoned application Serial No. 538,307, filed June 1, 1944.

We claim:

1. In a photometric apparatus including means for illuminating a sample with a spectrally narrow band of light and photometering means, an element of the apparatus polarizing light to a material extent sufficient to give different responses from a polarizing sample at various orientations, the improvement which comprises a plate of transparent optically active material intermediate the sample and the polarizing element cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

2. In a comparison photometric apparatus including means for illuminating a sample and a comparison standard with a spectrally narrow band of light, photometering means and means for directing light from both sample and standard to the photometering means, an element of the apparatus polarizing light to a material extent sufficient to give different responses from a polarizing sample at various orientations, the improvement which comprises a plate of transparent optically active material intermediate the sample and the polarizing element cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

3. In a photometric apparatus comprising a photoelectric device arranged to receive integrated light from a sample and a standard, an optical system arranged to control the light received by said device comprising in series means for emitting a spectrally narrow band of light, an angularly movable polarizing member, a second member having the property of dividing a light beam into two divergent beams which are polarized respectively in planes at right angles to each other, and a third member between the second member and the sample and standard capable of causing each beam to flicker from a minimum to a maximum, the flickering of the two beams being in opposite phase, and means by which the polarizing member may be angularly adjusted in accordance with the output of the photoelectric device, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

4. In a photometric apparatus comprising a photoelectric device arranged to receive integrated light from a sample and a standard, an optical system arranged to control the light received by said device comprising in series means for emitting a spectrally narrow band of light, an angularly movable polarizing member, a second member having the property of dividing a light beam into two divergent beams which are polarized respectively in planes at right angles to each other, a uniformly rotatable third member between the second member and the sample and standard capable of causing each beam to flicker by varying from a minimum to a maximum, the variation being in opposite phase, electric driving means for the angularly movable polarizing member responsive to alternating current of a predetermined frequency, means for uniformly rotating the beam flickering member at such a speed as to cause the beams to flicker at the same frequency to which the driving means of the angularly movable polarizing member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the angularly movable polarizing member, the phase of the flicker frequency of the amplifier output and electric driving means being so adjusted as to cause the polarizing member to rotate in a direction to produce the same total light from the sample and standard, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

5. In a photometric apparatus comprising a photoelectric device arranged to receive integrated light from a sample and a standard, an optical system arranged to control the light received by said device comprising in series an angularly movable polarizing member, a second member having the property of dividing a light beam into two divergent beams which are polarized respectively in planes at right angles to each other, and a third member between the second member and the sample and standard capable of causing each beam to flicker from a minimum to a maximum, the flickering of the two beams being in opposite phase, means by which the angularly movable polarizing member may be adjusted in accordance with the output of the photoelectric device, means for passing to the angularly movable polarizing member a beam of a narrow band of substantially monochromatic light of finite wavelength range, said means being further capable of varying the wavelength of said monochromatic light from one end of the spectrum to the other, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

6. In a photometric apparatus comprising a photoelectric device arranged to receive integrated light from a sample and a standard, an optical system arranged to control the light received by said device comprising in series an angularly movable polarizing member, a second member having the property of dividing a light beam into two divergent beams which are polarized respectively in planes at right angles to each other, a uniformly rotatable third member between the second member and the sample and standard capable of causing each beam to flicker by varying from a minimum to a maximum, the variation being in opposite phase, electric driving means for the first member responsive to alternating current of a predetermined frequency, means for uniformly rotating the beam flickering member at such a speed as to cause the beam to flicker at the same frequency to which the driving means at the first member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the first polarizing member, the phase of the flicker frequency of the amplifier output and electric driving means being so adjusted as to cause the polarizing member to rotate in a direction to produce the same total light from the sample and standard and means for passing to the first polarizing member a beam of a narrow band of substantially monochromatic light of finite wavelength range, said means being further capable of varying the wavelength of said monochromatic light from one end of the spectrum to the other, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

7. In a photometric apparatus having a flicker mechanism including in optical alignment the following elements, a source of light capable of emitting a spectrally narrow band of light, polarizing means capable of producing two divergent beams polarized at right angles to each other, means for rotating the planes of polarization of the beams at predetermined frequency in opposite phases, a fixed polarizing element through which the rotating polarized beams pass before encountering the materials to be measured, and an adjustable photometering element, the adjustment of which varies the relative intensities of the two polarized beams, one beam illuminating a standard and the other a sample, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

8. In a photometric apparatus containing a flicker mechanism for varying in opposite phase the intensity of two beams, comprising in optical alignment a source of light capable of emitting a spectrally narrow band of light, an adjustable photometering polarizer, means for splitting the light into two divergent beams polarized at right angles to each other, means for varying the states of polarization of said beams in opposite phases without substantial variation of the intensities of said beams, a fixed polarizing member through which the beams pass, said polarizing member producing two emergent beams which are non-varying in their states of polarization in the sense that the two ellipses symbolizing the states of polarization of the two beams are non-varying in eccentricity and in orientation but which fixed polarizing member causes the intensity of the non-varying polarized emergent beams to vary in opposite phases at flicker frequency, one beam illuminating a standard and the other a sample, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

9. In a photometric apparatus containing a flicker mechanism for varying in opposite phases the intensity of two beams comprising in optical alignment a source of light capable of emitting a spectrally narrow band of light, an adjustable photometering polarizer, means for splitting the light into two divergent beams polarized at right angles to each other, a rotatable retardation plate capable of varying the states of polarization in said beams in opposite phases without substantial variation of the intensity of said beams, a fixed polarizing member through which the beams pass, said polarizing member producing two emergent beams which are non-varying in their state of polarization in the sense that the two ellipses symbolizing the states of polarization of the two beams are non-varying in eccentricity and in orientation, but which fixed polarizing member causes the intensity of the non-varying polarized emergent beams to vary in opposite phase at flicker frequency, one beam illuminating a standard and the other a sample, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

10. In a photometric apparatus containing a flickering mechanism for varying in opposite phase the intensity of two beams comprising in optical alignment a source of light and an adjustable photometering polarizer, means for splitting the light into two divergent beams polarized at right angles to each other, a rotating polarizer capable of varying the intensity of the polarized emergent beams in opposite phases at flicker frequency, one beam illuminating a standard and the other a sample, the improvement which comprises a plate of transparent optically active material intermediate the flickering means and sample and standard, cut with faces at right angles to its optic axis and of such thickness that the light path therethrough parallel to the optic axis of the material is sufficiently long so that the difference in the rotation of the planes of polarization of plane polarized light at the ends of each 10 millimicron band width throughout the visible spectrum is at least 90° whereby the reflectance of a polarizing sample is substantially invariant with the azimuth of the sample.

11. Apparatus according to claim 1 in which the optically active plate is composed of quartz.

12. Apparatus according to claim 2 in which the optically active plate is composed of quartz.

13. Apparatus according to claim 3 in which the optically active plate is composed of quartz.

14. Apparatus according to claim 4 in which the optically active plate is composed of quartz.

15. Apparatus according to claim 5 in which the optically active plate is composed of quartz.

16. Apparatus according to claim 6 in which the optically active plate is composed of quartz.

17. Apparatus according to claim 7 in which the optically active plate is composed of quartz.

18. Apparatus according to claim 8 in which the optically active plate is composed of quartz.

19. Apparatus according to claim 9 in which the optically active plate is composed of quartz.

20. Apparatus according to claim 10 in which the optically active plate is composed of quartz.

EDWIN I. STEARNS, JR.
GEORGE L. BUC.

REFERENCES CITED

The following references are of record in the file of this patent:

UNITED STATES PATENTS

| Number | Name | Date |
|---|---|---|
| 2,189,270 | Pineo | Feb. 6, 1940 |

OTHER REFERENCES

"Manual of Petrographic Methods," by Johannsen, published 1918 by McGraw-Hill Company. Pages 108, 109 cited.

"Fundamentals of Physical Optics," by Jenkins and White, published 1937 by McGraw-Hill. Pages 370–372 cited.